United States Patent
Wüster

(10) Patent No.: US 8,940,530 B2
(45) Date of Patent: Jan. 27, 2015

(54) COMPOSTER FOR A GARDEN

(76) Inventor: Heinrich Wüster, Imst/Tirol (AT)

( * ) Notice: Subject to any disclaimer, the term of this patent is extended or adjusted under 35 U.S.C. 154(b) by 269 days.

(21) Appl. No.: 13/162,947

(22) Filed: Jun. 17, 2011

(65) Prior Publication Data

US 2011/0312083 A1    Dec. 22, 2011

(30) Foreign Application Priority Data

Jun. 17, 2010   (AT) ................. A 1001/2010

(51) Int. Cl.
  *C12M 1/00*    (2006.01)
  *C05F 17/02*   (2006.01)
(52) U.S. Cl.
  CPC .................. *C05F 17/0205* (2013.01)
  USPC .................... 435/290.1; 435/291.4
(58) Field of Classification Search
  CPC .................................. C05F 17/0018
  USPC .................. 435/289.1, 290.1–290.4
  See application file for complete search history.

(56) References Cited

U.S. PATENT DOCUMENTS

| | | | |
|---|---|---|---|
| 2,126,168 A * | 8/1938 | Breuchaud .................. 34/69 |
| 2,633,453 A * | 3/1953 | McAllister ................. 210/715 |
| 3,245,759 A * | 4/1966 | Eweson ...................... 422/210 |
| 5,031,796 A * | 7/1991 | Schafer et al. ............... 220/571 |
| 5,994,122 A * | 11/1999 | Cooper et al. ............. 435/290.1 |
| 6,284,528 B1 * | 9/2001 | Wright ..................... 435/290.2 |
| 7,299,746 B2 * | 11/2007 | LaPorte ..................... 100/226 |
| 2003/0059931 A1 * | 3/2003 | Gitt ........................ 435/290.1 |
| 2008/0041245 A1 * | 2/2008 | Judocus ..................... 100/118 |
| 2008/0070294 A1 * | 3/2008 | Teixeira ................... 435/290.1 |
| 2010/0193534 A1 * | 8/2010 | Roberts et al. .............. 220/810 |

FOREIGN PATENT DOCUMENTS

EP          606617 A1 *  7/1994

* cited by examiner

*Primary Examiner* — Michael Hobbs
*Assistant Examiner* — Liban Hassan
(74) *Attorney, Agent, or Firm* — Laurence A. Greenberg; Werner H. Stemer; Ralph E. Locher

(57) ABSTRACT

A composter having a downwardly open container (1) which stands on the ground (2) and has a filling opening which is arranged on the top side and can be closed by a lid (9). An unventilated upper chamber (10), which is arranged beneath the filling opening, opens laterally into a ventilated vertical shaft (13) which extends downward in the container (1) and is bounded at the lower end by a horizontally arranged lower plate (14) which is arranged between the shaft (13) and a downwardly open, ventilated lower chamber (17) which reaches down as far as the lower end of the container (1), and next to which in the container casing there is arranged a closable lateral removal opening. The lower plate (14) can be pivoted about a horizontal pivot (15) and is coupled to a movement mechanism which is to be actuated by hand and has a handle (18) arranged on the outside of the container (1).

27 Claims, 3 Drawing Sheets

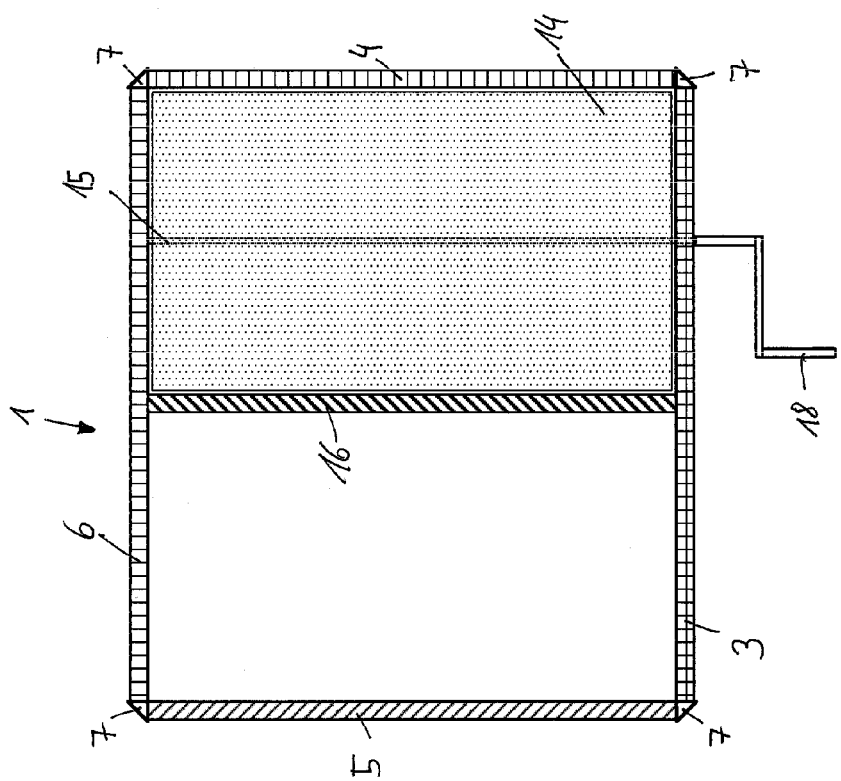
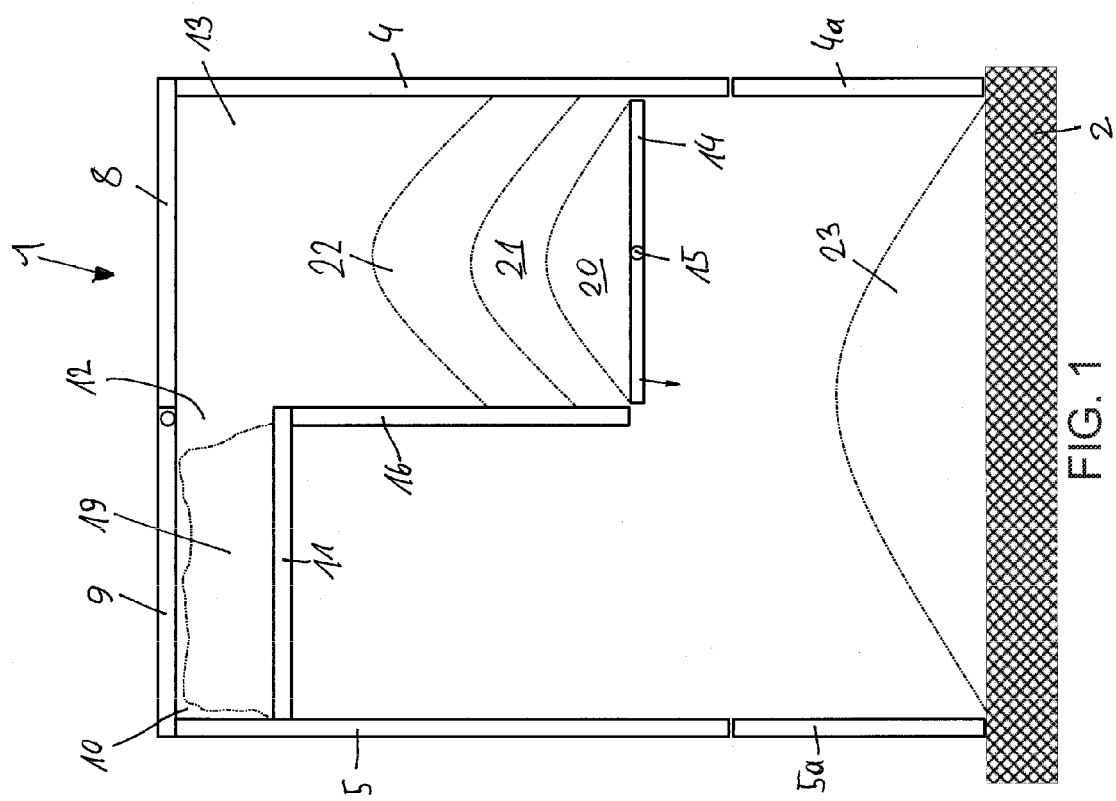

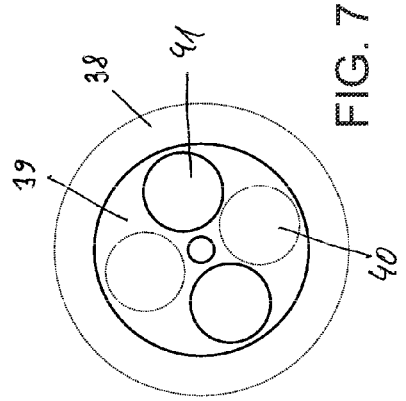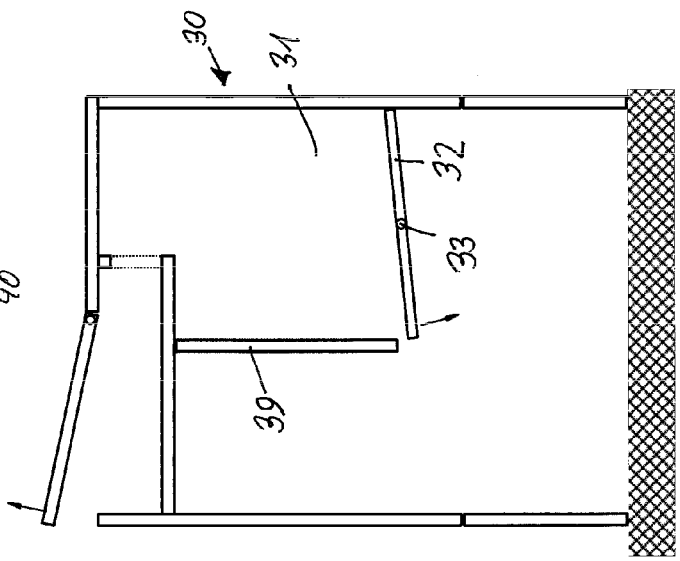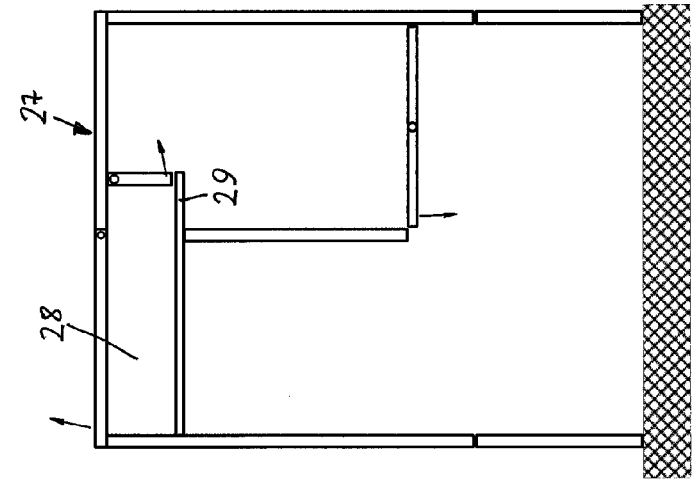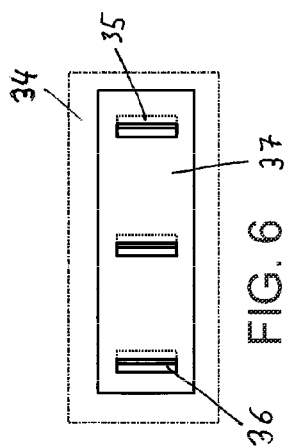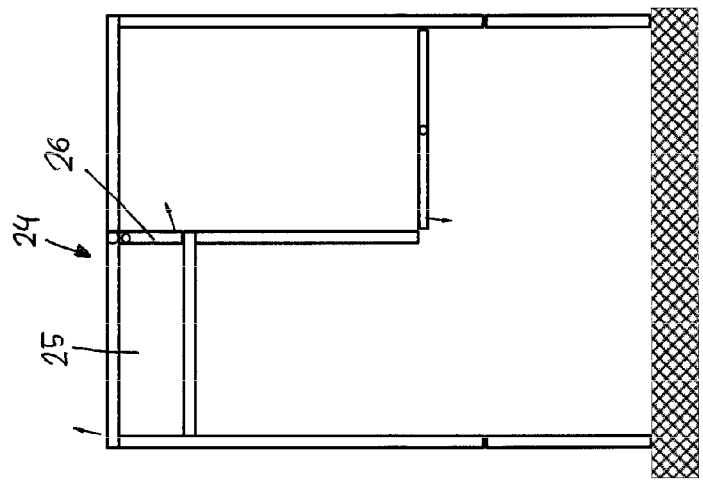

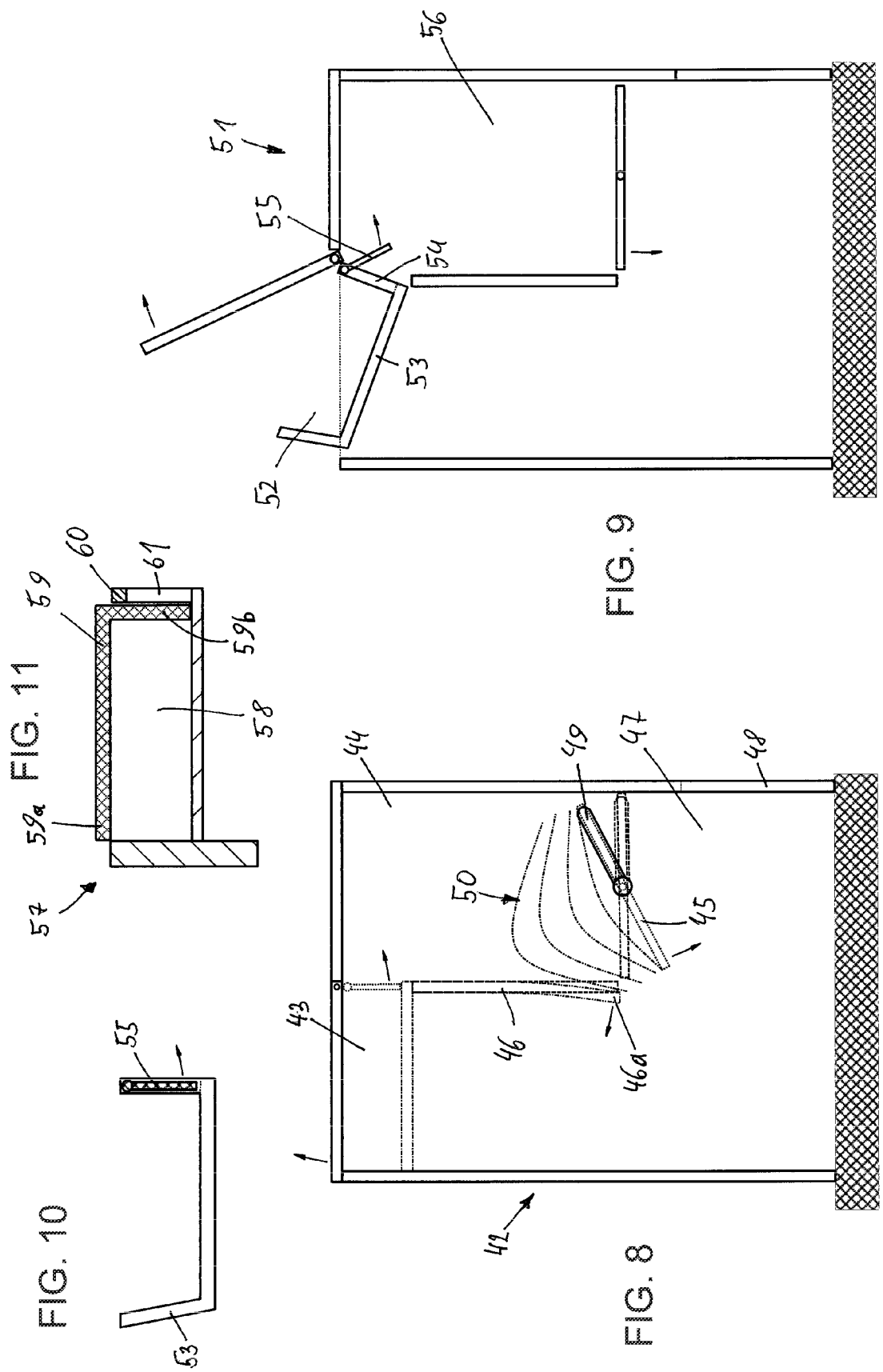

COMPOSTER FOR A GARDEN

FIELD OF THE INVENTION

The invention relates to a composter for the garden. The composter has a downwardly open container which stands on the ground. Arranged on the top side of the container is a filling opening which can be closed by a lid. The container has an outer container casing, which is provided in places with air passage openings, and a closeable lateral removal opening which is arranged in the lower half of the container.

PRIOR ART

Such composters are used to convert organic waste (biological waste) into compost, as is used in the garden or in agriculture. The waste (biological waste) is converted in the composter by the action of oxygen and soil bacteria into compost and soil matter such as humus. Organic waste (biological waste) which originates from the household, garden, agriculture, restaurants, trade or industry can be converted into compost in a composter. The organic waste (biological waste) is, for example, vegetable waste, fruit waste, withered flowers, tree cuttings, grass cuttings, etc.

Such composters are erected in the garden or at some other location on the ground. The lower end of the downwardly open container of the composter stands on the ground. The organic waste is introduced into the container a little at a time from above through the filling opening. Since the organic waste to be converted into compost usually accrues at different time intervals and in different amounts, amounts of material of varying size are introduced into the container at time intervals of varying length. The first amount of material introduced into the empty container drops down in the container over the entire height of the container and lands on the ground. The subsequently introduced amounts of material likewise drop down in the container and land on top of the previously introduced amount of material. This results in the container in a compost heap which gradually becomes larger. This compost heap consists of amounts of material arranged one on top of another. As the height of the compost heap increases, the amounts of material arranged in its lower part are compacted to an ever increasing extent by the amounts of material that are arranged in the upper part of the compost heap and weigh down on them. The amounts of material forming the compost heap have already been in the container for different amounts of time and the composting process of these amounts of material has already progressed to a different degree in a manner corresponding to the respective amount of time in the container. The bottom-most amount of material of the compost heap rests on the ground. It is located for the longest amount of time in the container and is compacted to the greatest degree by the weight of the compost heap weighing down on it. The composting process is furthest advanced in this amount of material. The top-most amount of material in the compost heap is in the container for the shortest amount of time. Every time a new amount of material is introduced, new material is applied to the top of the compost heap. As a result, the compost heap becomes larger and the compaction of the material in the lower part of the compost heap increases. The compost heap remains in the container for a number of weeks. After a number of weeks, the compost produced in the lower part of the compost heap by the composting process is removed from the container. The compost is removed through the lateral removal opening arranged in the lower half of the container.

At the removal opening, only that part of the compost heap that is located next to the removal opening can be removed. This part of the compost heap can also include uncomposted organic waste which was introduced into the container with a new amount of material and has rolled down the top side of the compost heap and now is located next to the removal opening, even though in the case of this waste the composting process has not yet even begun. This uncomposted organic waste is inevitably removed from the container together with the finished compost. The compost removed then has to be worked through by hand, for example with a rake, in order to separate out the uncomposted organic waste from the compost before the latter can be used further. The still uncomposted organic waste that is separated out can be reintroduced from above into the container.

There are known composters which have a cylindrical or frustopyramidal container which is downwardly open and stands on the ground by way of its open lower end. Provided on the top side of the container is a filling opening which can be closed by a lid. Provided in the lower half of the container is a closeable lateral removal opening. The removal opening is arranged in the casing of the container and reaches down as far as the lower end of the container. The casing of the container is provided with numerous air passage openings through which air from the environment can pass into the container.

In these composters, the composting process proceeds relatively slowly. The amounts of material introduced at any one time into the container are usually too small to produce such heating in the compost heap in the container as to allow undesired bacteria to be killed off and the moisture in the material to be released. The material introduced a little at a time into the composter therefore rots only very slowly.

In order to accelerate the composting process, it is recommended after a number of weeks to turn over the partially filled composter by hand and during this turning over to thoroughly mix up the material contained in the container. However, this requires a very time-consuming and labor-intensive procedure for the user of the composter. The user can basically choose between two procedures.

In the first procedure, the container remains on the ground and only the relatively large compost heap in the container is turned over. To this end, the user first has to divide the relatively large compost heap through the lateral removal opening in the container into a large number of small amounts of material corresponding to the size of the removal opening. The user has to deposit these amounts of material on the ground next to the container, with a new compost heap being produced there. When the container is empty, the user has to divide the compost heap lying on the ground next to the container again into a large number of small amounts of material, corresponding this time to the size of the filling opening of the container, and fill these amounts of material one after another into the container from above through the filling opening.

In the second procedure, first the container and then the relatively large compost heap are turned over. To this end, the user has to lift the container off the relatively large compost heap arranged in the container and then put the container back down on the ground at some distance from this compost heap. Then, the user has to divide the relatively large compost heap into a large number of small amounts of material corresponding to the size of the filling opening of the container and fill these amounts of material one after another into the container from above through the filling opening.

In both cases, the user requires a pitchfork or similar implement in order to divide the respective, relatively large compost heap into a large number of small amounts of material and in order then to fill the small amounts of material into the empty container from above through the filling opening. In both cases, a relatively large and relatively old compost heap has to be turned over. In the lower part of this compost heap, the composting process has already progressed to a very great degree, and for this reason the material in the lower part of the compost heap is already highly compacted. This compaction of the material, which is caused by the composting process, makes it harder to divide the compost heap manually with the aid of a pitchfork. Therefore, the manual turning over of the relatively large compost heap can become heavy labor for a person working with a pitchfork.

In both cases, not only does the user himself get dirty, but he is also exposed to the odors associated with the rotting of the material. In addition, the user is confronted by the small animals, such as worms, beetles, woodlice, etc. that live in the compost heap. In addition, the compost heap arranged in the container attracts flying and crawling pests which get into the container and to the compost heap through the air passage openings in the container casing. When an amount of material is introduced into the container by the flapping open of the lid covering in the filling opening, these pests are activated and crawl or fly away from the compost heap. The same happens when the user, when turning over the composter, flaps up the lid covering the filling opening and divides the compost heap into small amounts of material with the aid of a pitchfork and then fills this material back into the container from above. Not only the user opening the lid of the filling opening of the container is bothered and threatened by these pests, but also the user manually turning over the composter. In both cases, the labor inevitably involved in manually turning over the composter is uncomfortable and also unhygienic for the user.

SUMMARY OF THE INVENTION

It is the object of the invention to specify a novel composter which is placed with its container on the ground and in which organic waste (biological waste) is converted by the action of oxygen and soil bacteria into compost and soil matter such as humus.

In order to achieve this object, the invention proposes a novel composter. The latter has a downwardly open container which stands on the ground. Arranged on the top side of the container is a filling opening which can be closed by a lid. Provided in the container is an unventilated upper chamber which is arranged beneath the filling opening and has a lateral outlet arranged in the container. Provided in the container is a first composting chamber which is in the form of a ventilated, vertical shaft, extends downward past the lateral outlet of the upper chamber starting from the upper end of the container and is bounded at its bottom shaft end by a horizontally arranged lower plate which can be pivoted about a horizontal pivot in order to empty the shaft. The composter is provided with a movement mechanism assigned to the lower plate, said movement mechanism being mechanically coupled to the lower plate and having a handle which is arranged on the outside of the container and with the aid of which the lower plate can be pivoted about a horizontal pivot. Provided in the container is a downwardly open, ventilated second composting chamber which is arranged directly above the ground and on the top side of which the lower plate is arranged. The container is provided with a closeable lateral removal opening which is arranged next to the second composting chamber.

In the composter according to the invention, the organic waste (biological waste) is collected in the unventilated upper chamber until a relatively large batch of material has been produced. The relatively large batch of material is then introduced as a whole into the first composting chamber, in which the first composting phase takes place. The batch of material is introduced through the lateral outlet of the upper chamber into that region of the vertical shaft that is arranged next to the upper chamber. In the process, the batch of material breaks up into a number of component parts which drop down freely in the shaft and land on the horizontally arranged lower plate. At that point, there is produced a first, upper material heap, in which the first composting phase takes place, while in the now empty upper chamber a new, second batch of material is collected. The second batch of material is then introduced, likewise as a whole, into the first composting chamber. The parts of the batch of material that are produced during the introduction of the second batch of material and drop down freely in the shaft land on the upper material heap and form there a new, freshly heaped-up upper material layer.

While the first composting phase continues, the waste rots and is considerably reduced in volume in the waste contained in the upper material heap, in the now empty upper chamber, a new, third batch of material is collected. When the unventilated upper chamber has been filled with the third batch of material and the third batch of material is intended to be introduced into the first composting chamber, first of all the first composting chamber is emptied into the second composting chamber by pivoting the lower plate. In the process, the upper material heap is mixed up somewhat while it drops down from the pivoted lower plate and breaks up into a number of parts which drop down in the second composting chamber and land on the ground, where a second, lower material heap is produced where the second composting phase takes place.

Following the emptying of the first composting chamber, the lower plate is pivoted into a horizontal position. Subsequently, the third batch of material is introduced into the first composting chamber, in which a new upper material heap is produced on the lower plate. While the first composting phase takes place in the new upper material heap formed by the third batch of material, in the once again empty upper chamber, a new, fourth batch of material is collected. This is introduced into the first composting chamber and a new, freshly heaped-up upper material layer is produced on the new upper material heap.

While the first composting phase continues, the waste rots and is considerably reduced in volume in the waste contained in the new upper material heap, in the once again empty upper chamber, a new, fifth batch of material is collected. Before this is introduced into the first composting chamber, the latter is emptied for a second time into the second composting chamber by pivoting the lower plate. In the process, the new upper material heap is mixed up somewhat while it drops down from the pivoted lower plate and breaks up into a number of parts which drop down in the second composting chamber and land on the second, lower material heap which lies on the ground in the second composting chamber.

Following the second emptying of the first composting chamber, the lower plate is once again pivoted into a horizontal position. Subsequently, the fifth batch of material is introduced into the first composting chamber in which a new upper material heap is produced on the lower plate, the first composting phase continuing in said new upper material heap while in the empty upper chamber again a new, sixth batch of material is collected.

During the first composting phase, air flows into the first composting chamber from the environment of the composter via ventilation openings arranged in the container casing and starts in the waste contained in the upper material heap a composting process, in which this waste rots and is considerably reduced in volume. The amount of organic waste (biological waste) introduced into the first composting chamber with each batch of material is sufficient to generate perceptible heating of the waste during the composting process, said heating being sufficient to kill off undesired bacteria and to force the release of moisture.

At the end of the first composting phase, the upper material heap which has considerably reduced in volume is conveyed downward out of the first composting chamber and into the second composting chamber by pivoting the lower plate and forms there a part of the lower material heap lying on the ground.

In the second composting chamber, the second composting phase takes place in the lower material heap lying on the ground. The waste contained in the lower material heap is converted in the second composting phase, under the action of oxygen and soil bacteria, into compost and soil matter such as humus.

The compost produced in the second composting chamber is removed from the container or from the composter via the lateral removal opening arranged next to the second composting chamber.

The composter is handled manually.

The unventilated upper chamber is filled manually with organic waste (biological waste) by the user of the composter. Likewise, the upper chamber is emptied manually into the first composting chamber. In addition, a small hand shovel or other handheld implement can be used. When emptying the upper chamber, the user pushes the batch of material collected in the upper chamber through the lateral outlet in the upper chamber, laterally out of the upper chamber and simultaneously into the upper region of the first composting chamber, in which the batch of material automatically drops down and breaks up into individual parts.

The emptying of the first composting chamber is also carried out manually. To this end, the movement mechanism assigned to the lower plate and mechanically coupled thereto is actuated by the handle arranged on the outside of the container, and the lower plate pivots about a horizontal pivot. Following the emptying of the first composting chamber, the lower plate is pivoted back manually into a horizontal position via the movement mechanism.

The compost is likewise removed manually from the second composting chamber of the composter. To this end, first of all the lateral removal opening of the composter, said opening being arranged next to the second composting chamber, is opened. Then, the user of the composter removes the compost manually, e.g. with the aid of a shovel, a rake or a pitchfork, from the second composting chamber.

In a further configuration of the invention, the composter may have a partition wall which is arranged in the container, laterally bounds the vertical shaft and is provided with air passage openings. The partition wall may be in the form of an elastic, flexible plate, at least in its lower half. The partition wall may be formed such that it can be pivoted about a horizontal pivot and can be locked in a substantially vertical position in the container. A locking device for the pivotable partition wall may be provided at the lower end of the vertical shaft. There may be provided a movement mechanism which is mechanically coupled to the pivotable partition wall and is provided with a handle arranged on the outside of the container.

In a further configuration of the invention, the unventilated upper chamber may have a closeable lateral outlet which is arranged in the container. The lateral outlet may be able to be closed by a plate-like slide which is arranged in the upper chamber and is provided with a handgrip. At the lateral outlet of the upper chamber there may be provided a pivotable flap that closes said outlet. At the lateral outlet of the upper chamber there may be provided a pivotable flap which is preloaded into its closed position. At the lateral outlet of the upper chamber there may be provided a pivotable flap which can be locked in a position closing the outlet.

In a further configuration of the invention, beneath the filling opening there may be provided a box-like insert which contains the unventilated upper chamber together with its lateral outlet arranged in the container. In the box-like insert there may be provided a plate-like slide which is provided with a handgrip and with which the lateral outlet can be closed. At the lateral outlet of the box-like insert there may be provided a pivotable flap that closes the outlet. The pivotable flap may be preloaded into its closed position by means of a spring or by a weight. The pivotable flap arranged in the box-like insert may be formed such that it can be locked in its closed position in the box-like insert.

In a further configuration of the invention, beneath the filling opening there may be provided a trough which can be pivoted about a horizontal pivot and contains the unventilated upper chamber together with its lateral outlet arranged in the container. The trough may be provided with a movable flap that closes the lateral outlet. The movable flap may be preloaded into its closed position by means of a spring or by a weight.

In a further configuration of the invention, the lower plate may be rigidly connected to a pivot which is mounted in a rotatable manner in the container and has a pivot portion which protrudes beyond the outside of the container and to which the handle of the movement mechanism is rigidly connected. The handle of the movement mechanism may be in the form of a one-armed lever. The handle of the movement mechanism may be in the form of a crank. There may be provided a locking device which is fitted on the outside of the container and can be brought into engagement with the handle of the movement mechanism when the lower plate is arranged in the horizontal position.

In a further configuration of the invention, the lower plate may be provided with air passage openings. The lower plate may be in the form of a grating.

In a further configuration of the invention, the container may have a container wall which is arranged in the region of the ventilated vertical shaft and is provided with adjustable air passage openings. In order to regulate the cross section of the air passage openings, movable slides may be provided along the container wall. In the container wall there may be provided rotatable butterfly ventilators which by rotation regulate the cross section of the circular air passage openings arranged in the container wall.

In a further configuration of the invention, there is proposed a composter which has a downwardly open container which is provided on the top side with a filling opening that can be closed by a lid, and has an outer container casing which is provided with air passage openings and contains a closeable lateral removal opening which is arranged in the lower half of the container.

This composter is characterized by the following features. Beneath the filling opening there is provided an unventilated, upwardly open upper chamber which extends only over a part of the cross section of the container. The upper chamber is bounded downwardly by a closed bottom and is provided at its front end, which is arranged inside the container, with a closeable passage. The passage opens into an upper region, arranged next to the upper chamber, of a ventilated collection chamber. The ventilated collection chamber extends downward from the upper end of the container and is arranged between a region, provided with air passage openings, of the container casing and a partition wall, which is arranged inside the container and is provided with air passage openings. The ventilated collection chamber is bounded by a lower plate at a lower level which is offset downwardly with respect to the bottom of the upper chamber. The lower plate is arranged such that it can be pivoted about a horizontal pivot, can be locked in a horizontal position and is coupled to a movement mechanism which passes through the container casing and has a handle arranged outside the container. Beneath the lower level there is provided a ventilated, downwardly open chamber which reaches downward as far as the lower end of the container and is bounded on the outside by a portion of the container casing in which at least one movable lateral removal opening is arranged.

In this embodiment of the composter, the ventilated collection chamber arranged in the container forms the first composting chamber of the composter, in which the first composting phase takes place, and the ventilated lower chamber, which is downwardly open and reaches downward as far as the lower end of the container, forms the second composting chamber of the composter, in which the second composting phase takes place. The collection chamber forming the first composting chamber extends downward from the upper end of the container as far as the lower level and is bounded downwardly there by the lower plate. The collection chamber represents a vertical shaft which is arranged in the chamber and is arranged between a region, provided with air passage openings, of the container casing and a partition wall which is arranged inside the container and is provided with air passage openings. The lower chamber, which is arranged beneath the lower level and reaches downward as far as the lower end of the container, is the second composting chamber, which is arranged directly above the ground and in which the second composting phase takes place.

In this configuration of the composter, the organic waste (biological waste) is collected in the upper chamber to form relatively large batches of material which are introduced as a whole into the ventilated collection chamber. When they are introduced into the collection chamber, the batches of material break up into component parts which drop down freely in the collection chamber and at the lower end of the collection chamber form a first material heap on the horizontally arranged lower plate. A first composting phase takes place in the ventilated collection chamber, during which the organic waste lying on the lower plate partially rots and is considerably reduced in volume. The amount of organic waste introduced into the collection chamber with each batch of material is large enough for the composting to be associated with perceptible heating. The heating accelerates the composting process and also the reduction in moisture. Once two or more batches of material have been introduced into the ventilated collection chamber, the material heap, which is arranged on the lower plate and consists of partially rotted organic waste that has considerably reduced in volume, is removed from the collection chamber by pivoting of the lower plate and is introduced into the ventilated lower chamber located underneath. The material heap slides down off the pivoted, oblique lower plate and breaks up into its component parts, which drop down freely in the lower chamber, fall onto the ground which terminates the lower chamber downwardly and form a new material heap there.

Once the ventilated collection chamber has been emptied, the lower plate is pivoted back into its horizontal position. Now, two or more batches of material can again be introduced one after another into the collection chamber. The batches of material break up into their component parts in the collection chamber. These component parts drop down freely in the collection chamber and form on the lower plate a new material heap which consists of partially rotted organic waste that has considerably reduced in volume. The new material heap is likewise removed from the collection chamber and introduced into the ventilated lower chamber located underneath the latter by pivoting of the lower plate. The new material heap likewise slides down off the pivoted, oblique lower plate and breaks up into its component parts. These component parts drop down freely in the lower chamber and onto the material heap already lying on the ground.

In the lower chamber, the organic waste which has partially rotted and considerably reduced in volume in the ventilated collection chamber is converted in a second composting phase, under the action of oxygen and soil bacteria, into compost or soil matter such as humus.

The batches of material produced in the upper chamber are relatively large amounts of organic waste, with the pieces of waste lying loosely alongside one another in the upper chamber on the bottom of the upper chamber. The batches of material are introduced into the collection chamber by emptying the upper chamber. The user of the composter empties the upper chamber into the ventilated collection chamber manually, for example by means of a small hand shovel.

When the upper chamber is emptied, the batches of material are pushed in each case over the front end, arranged in the container, of the bottom of the upper chamber and are conveyed at the same time into the empty upper region of the collection chamber, where there is no mechanical support for the pieces of organic waste lying largely loosely alongside one another within the batch of material. Upon entering the collection chamber, each batch of material therefore breaks up into its component parts, which drop down freely in the collection chamber and are caught at the lower end of the collection chamber by the lower plate which is arranged horizontally there. On the lower plate, the organic waste which has dropped down freely forms a freshly heaped-up material heap.

The upper chamber is emptied repeatedly at relatively long time intervals into the ventilated collection chamber. In the process, each batch of material which is pushed over the front end, arranged in the container, of the bottom of the upper chamber breaks up into its component parts, which drop down freely in the collection chamber and form a freshly heaped-up new top layer on the material heap lying on the lower plate.

The organic waste, which accrues in a sporadic manner and in relatively small amounts, is collected in the upper chamber until it forms a batch of material that largely fills the upper chamber. A relatively long period of time is usually required for this collection process, with material being introduced manually into the upper chamber during this period. No further material is introduced into the collection chamber during this relatively long period of time, but the first composting phase continues to proceed in the organic waste already lying on the lower plate.

The finished compost is removed from the lower chamber. To this end, the lateral removal opening arranged in the container casing is opened and the compost is removed from the container through this removal opening.

According to a further feature of the invention, it may be provided that a plate-like slide, which is provided with a handgrip and in its furthest forward position closes the passage arranged at the front end of the upper chamber, be arranged in the upwardly open chamber which is arranged beneath the filling opening.

In this configuration of the composter, the user can push the contents of the upper chamber out of the upper chamber with the aid of the plate-like slide and thereby convey it into the ventilated collection chamber. At the end of this pushing-out movement, the user arrives with the plate-like slide at the passage arranged at the front end of the upper chamber and can close said passage directly with the plate-like slide, which remains in its closed position in the upper chamber. The upper chamber is then filled with organic waste behind the plate, closing the passage, of the slide.

The plate-like slide may be provided with a plate which is arranged vertically in the upper chamber and from which a rod having a handgrip at its end protrudes perpendicularly.

In a further configuration of the invention, a wall element which is provided with a passage may be arranged at the front end of the upper chamber.

In the case of a composter, in which a plate-like slide is arranged in the upper chamber, the user pushes the contents of the upper chamber with the aid of the slide out of the upper chamber. At the end of the pushing-out movement, the user butts against the wall element with the slide and in the process closes the passage in the wall element by way of the plate of the slide. The user then leaves the slide in this position in the upper chamber, which is then filled with organic waste behind the plate of the slide.

In a further configuration of the invention, a wall element which is provided with a passage and has a movable flap that closes the passage may be arranged at the front end of the upper chamber.

In this configuration of the composter, the contents of the upper chamber are pushed out of the upper chamber through the passage. In the process, the movable flap is pivoted by the organic waste and the passage is opened. When the upper chamber is empty, the movable flap pivots back into its starting position and closes the passage.

According to the invention, the movable flap can be connected in a pivotable manner to the wall element via a film hinge arranged at its upper end.

In a further configuration of the invention, it may be provided that the upper chamber and the passage arranged at the front end of the upper chamber be arranged in a box-like insert which is arranged beneath the filling opening and extends over only a part of the cross section of the container.

In this configuration of the composter, the box-like insert may be inserted into a container, with the container casing being formed by four side walls which are connected to one another at their side edges by plug-type connections and which have air passage openings distributed uniformly over their entire surface.

In a further configuration of the invention, it may be provided that the upper chamber and the passage arranged at the front end of the upper chamber be arranged in a trough which can be pivoted about a horizontal pivot, is arranged beneath the filling opening and extends only over a part of the cross section of the container.

This configuration makes it possible to empty the upper chamber into the ventilated collection chamber by simply pivoting the trough. With the trough pivoted, the organic waste slides out of the trough along the oblique bottom of the trough, out of the upper chamber and into the ventilated collection chamber. Once the trough has been emptied, it is pivoted back into its horizontal position.

In a further configuration of the invention, it may be provided that the partition wall arranged inside the container and bounding the collection chamber be in the form, at least in its lower half, of an elastic, flexible plate.

In this configuration of the composter, the lower half of the ventilated collection chamber is bounded laterally by the elastic, flexible lower half of the partition wall. When the collection chamber is emptied, the horizontally arranged lower plate is rotated, together with the material heap lying on it. In the process, the material heap is pushed against the lower half of the partition wall and the lower half of the partition wall deforms elastically. The elastic deformation of the lower half of the partition wall ends when the material heap has detached from the rotated lower plate and has dropped down into the lower chamber.

In a further configuration of the invention, it may be provided that the partition wall arranged inside the container and bounding the collection chamber be arranged such that it can be pivoted about a horizontal pivot arranged close to the bottom of the upper chamber and that said partition wall can be locked in a substantially vertical working position.

This configuration of the composter makes it possible to release the partition wall from its locking before the lower plate is rotated, so that when the lower plate is rotated the partition wall is pivoted somewhat laterally by the material heap lying on the lower plate so that the material heap, when it detaches from the lower plate, is distributed over a relatively large region of the lower chamber of the container. When the material heap lies on the ground in the lower chamber, the lower plate is rotated back into a horizontal position and the partition wall is moved back into its working position and is locked in this position in order that the organic waste subsequently introduced into the collection chamber is unable to pivot the partition wall to the side and to drop past the lower plate into the lower chamber of the container.

According to the invention, close to the lower plate there may be provided a locking device which is provided with an exchangeable locking element which protrudes beyond the inside of the container casing and on which the rear side of the partition wall is supported when it is in its working position.

According to a further feature of the invention, close to the bottom of the upper chamber there may be provided a pivot which is mounted in a rotatable manner in the container casing, is rigidly connected in the container to the pivotable partition wall and has a pivot portion which protrudes outward beyond the container casing and to which an actuating element adjacent to the outside of the container is rigidly connected.

According to a further feature of the invention, the movement mechanism may have a pivot which is mounted in a rotatable manner in the container casing, is rigidly connected in the container to the lower plate and has a pivot portion which protrudes outward beyond the container casing and to which the handle arranged on the outside of the container is rigidly connected.

According to the invention, there may be provided a locking device which is fitted on the outside of the container casing and can be brought into engagement with the handle of the movement mechanism when the lower plate is arranged in the horizontal position.

The lower plate may be provided with air passage openings. The lower plate may be in the form of a grating.

BRIEF DESCRIPTION OF THE DRAWINGS

In the drawings:

FIG. 1 shows a side elevation of a composter,

FIG. 2 shows a horizontal section through the composter from FIG. 1,

FIG. 3 shows a side elevation of a second composter,

FIG. 4 shows a side elevation of a third composter,

FIG. 5 shows a side elevation of a fourth composter,

FIG. 6 shows a detail of a container wall,

FIG. 7 shows a further detail of a container wall,

FIG. 8 shows a side view of a fifth composter,

FIG. 9 shows a side elevation of a sixth composter,

FIG. 10 shows a detail of the composter from FIG. 9, and

FIG. 11 shows the upper chamber of a composter according to the invention with a plate-like slide arranged in the upper chamber.

DESCRIPTION OF EXEMPLARY EMBODIMENTS

FIGS. 1 and 2 show a composter having a downwardly open container 1 which stands on the ground 2 by way of its open lower end. The container 1 has a cuboidal interior, which is bounded by four side walls 3, 4, 5, 6, which are connected together at their vertically extending side edges via plug-type connections 7. The side walls 3, 4, 5, 6 are provided with air passage openings which are not illustrated in the drawings. The four side walls 3, 4, 5, 6 form the outer container casing. Provided in the lower half of the container 1 are two removal openings. These are located in two mutually opposite side walls 4, 5 and are closed by removable wall elements 4a, 5a of these side walls 4, 5.

Arranged on the top side of the container 1 is a cover panel 8, which terminates the interior of the container 1 upwardly. Provided in the left-hand half, with respect to FIG. 1, of the cover panel 8 is a filling opening which can be closed by a lid 9. Provided in the interior of the container 1, beneath the filling opening or beneath the lid 9, is an unventilated, upwardly open upper chamber 10. The upper chamber 10 is terminated downwardly in the container by a bottom 11. Inside the container 1, the upper chamber opens via a lateral outlet 12 into a ventilated collection chamber 13 arranged next to the upper chamber 10. The lateral outlet 12 forms a passage for the batches of material to be conveyed out of the upper chamber 10, said passage being arranged at the front end, arranged inside the container, of the upper chamber 10.

The ventilated collection chamber 13 is accommodated in the right-hand half, with respect to FIG. 1, of the container 1. It reaches downward from the underside of the cover panel 8 as far as a lower level which is offset some way downwardly with respect to the bottom 11 of the upper chamber 10. It is bounded at its lower end by a lower plate 14 which can be rotated about a horizontal pivot. The rotary pivot 15 of the lower plate 14 is arranged at the lower level. In the container 1, the collection chamber 13 is bounded by a vertical partition wall 16. The partition wall 16 is provided with air passage openings which are not illustrated in the drawings. The partition wall 16 extends downward next to the collection chamber 13. It reaches downward from the bottom 11 of the upper chamber 10 as far as the lower level. Outwardly, the collection chamber 13 is bounded on three sides by the side walls 3, 4 and 6, which are provided with air passage openings, of the container 1.

The collection chamber 13 represents a vertical shaft which is arranged in the container 1, extends downward past the upper chamber 10, starting from the under side of the cover panel 8, and ends at the lower plate 14 arranged at the lower level.

The container 1 has a ventilated lower chamber 17, which reaches downward as far as the lower end of the container. The lower chamber 17 is downwardly open toward the ground. It is bounded outwardly by the side walls 3, 4, 5, 6 of the container 1, of which two are provided in the region of the lower chamber 17 with removal openings, which are closed by a removable wall element 4a, 5a of the relevant side wall 4, 5.

The lower plate 14, which is arranged at the lower end of the collection chamber 13, is arranged between the collection chamber 13 and the lower chamber 17. The lower plate 14 is coupled to a movement mechanism. The latter comprises the horizontally arranged rotary pivot 15 to which the lower plate 15 is rigidly connected. The rotary pivot 15 is mounted in a rotatable manner in the two side walls 3 and 6 of the container 1. The rotary pivot 15 protrudes outwardly beyond the side wall 3. Outside the container 1, it is rigidly connected to a handle 18 in the form of a crank. By rotating the crank 18, the lower plate 14 can first be positioned obliquely and then vertically and can also be rotated through 180 degrees.

The organic waste respectively arranged in the unventilated upper chamber 10, in the ventilated collection chamber 13 and in the ventilated lower chamber 17 is illustrated schematically in FIG. 1. The upper chamber 10 is largely filled with organic waste 19. In the ventilated collection chamber 13, a material heap, in which the pieces of organic waste of three batches of material 20, 21, 22 lie one on top of another, lies on the horizontally arranged lower plate 14. In the ventilated lower chamber 17, a material heap 23 consisting of organic waste lies on the ground 2.

In the container in FIG. 1, the passage 12 arranged at the front end of the upper chamber 10 is open. The passage 12 can be closed with the aid of a plate-like slide which is arranged loosely in the upper chamber 10 and remains with its plate arranged vertically in the upper chamber 10 while the latter is filled with organic waste.

FIG. 3 shows a composter 24 which corresponds substantially to the composter in FIGS. 1 and 2. In the case of the composter in FIG. 3, at the front end of the upper chamber 25 there is arranged a pivotable flap 26 which, when the upper chamber 25 is emptied, is pivoted by the organic waste pushed out of the upper chamber 25 and returns to its starting position automatically after the upper chamber 25 has been emptied.

FIG. 4 shows a composter 27 which corresponds substantially to the composter in FIG. 3. In the case of the composter 27, the bottom 29 of the upper chamber 28 extends some way into the right-hand half of the container.

FIG. 5 shows a further composter 30, the structure of which corresponds substantially to that of the composter in FIGS. 1 and 2. In the case of the composter 30, however, the partition wall 39 bounding the ventilated collection chamber 31 is not arranged in the middle between the left-hand and right-hand halves of the container but is arranged in a manner offset some way to the left into the left-hand half of the container. The collection chamber 31 of the composter 30 is therefore somewhat wider than the collection chamber 13 of the composter in FIGS. 1 and 2. In the case of the composter 30, the lower plate 32, which can be rotated about the horizontal rotary pivot 33, is also somewhat wider than the lower plate 14 of the composter in FIGS. 1 and 2.

In the case of the composters in FIGS. 1-5, the lower plate can be provided with air passage openings. However, the lower plate can also be in the form of a grate or grating, on which the organic waste lies while it partially rots and is considerably reduced in volume in the ventilated collection chamber as part of the first composting phase.

FIG. 6 shows a detail of a container wall 34. This detail shows three air passage openings 35 and a slide 37 provided with three air passage openings 36. By moving the slide 37, the cross section of the air passage openings 35 arranged in the container wall 34 can be adjusted or the air passage openings 35 can be closed completely.

FIG. 7 shows a detail of a container wall 38 in which there is arranged a rotatable butterfly ventilator 39 which covers two circular air passage openings 40 arranged in the container wall 38 and itself has two circular air passage openings 41.

FIG. 8 shows a side view of a further composter 42 according to the invention, having an upper chamber 43, a ventilated collection chamber 44, a rotatable lower plate 45, an inner partition wall 46, a lower chamber 47 and a lateral removal opening 48 in a side wall, adjoining the lower chamber 47, of the container. The inner partition wall 46 has a lower half 46a which is in the form of an elastic, flexible plate. The rotatable lower plate 45 is mechanically coupled to a movement mechanism which is actuated via a one-armed lever 49 arranged on the outside of the composter 42. This lever 49 assumes the same position on the outside of the composter 42 as the rotatable lower plate 45 arranged inside the composter 42. In FIG. 8, the horizontal position of the lever 49 and the lower plate 45 is illustrated, as is a somewhat rotated oblique position of the lever 49 and the lower plate 45 with respect to the horizontal position.

FIG. 8 shows a material heap 50 which is lying on the obliquely arranged lower plate 45 and is pushing against the elastic, flexible lower half 46a of the inner partition wall 46 and elastically deforming the latter.

FIG. 9 shows a further composter 51 according to the invention. In the case of this composter 51, the upper chamber 52 is arranged in a pivotable trough 53 which provides a passage 54 that is arranged at the front end of the upper chamber 52 and can be closed by a pivotable flap 55. FIG. 9 shows the trough 53, the rear end of which has been pivoted up, in the oblique position provided for emptying the upper chamber 52. The organic waste (not illustrated) slides out of the trough 53 into the ventilated collection chamber 56 of the composter 51. FIG. 10 shows the trough 53 of the composter 51 in its horizontal position.

FIG. 11 shows a detail of a composter 57 having an upper chamber 58 and a plate-like slide 59 arranged in said upper chamber 58. The slide 59 has a handgrip 59a and lies with the plate 59b, arranged at its front end, against a wall element 60 which terminates the upper chamber 58 at its front end and contains a passage 61 for the organic waste.

The invention claimed is:

1. A composter, comprising:
   (a) a downwardly open container configured to stand on the ground;
   (b) said container having a top side formed with a filling opening and a lid for closing said filling opening;
   (c) an unventilated upper chamber formed beneath said filling opening and having a lateral outlet inside said container;
   (d) a ventilated, vertical shaft forming a first composting chamber, said vertical shaft extending downward from an upper end of said container past said lateral outlet of said upper chamber and having a bottom shaft end bounded by a horizontally arranged lower plate, said lower plate being pivotally mounted for pivoting about a horizontal pivot axis in order to empty said shaft;
   (e) a movement mechanism mechanically coupled to said lower plate and having a handle disposed on an outside of said container;
   (f) a downwardly open, ventilated second composting chamber formed directly above the ground and being upwardly delimited by said lower plate;
   (g) a closable lateral removal opening formed next to said second composting chamber; and
   a partition wall disposed in said container, laterally bounding said vertical shaft and having air passage openings formed therein, said partition wall extending vertically and defining a closed chamber together with said lower plate, said partition wall being configured for pivoting away from said lower plate and opening said closed chamber when material is pushed against said partition wall by a rotation of said lower plate.

2. The composter according to claim 1, wherein said partition wall is an elastic, flexible plate, at least in a lower half thereof.

3. The composter according to claim 1, wherein said partition wall is pivotally mounted about a horizontal pivot and said partition wall is lockable in a substantially vertical position in said container.

4. The composter according to claim 3, which comprises a locking device for locking said pivotable partition wall disposed at a lower end of said vertical shaft.

5. The composter according to claim 3, which further comprises a movement mechanism mechanically coupled to said pivotable partition wall and having a handle disposed outside of said container.

6. The composter according to claim 1, which comprises a closure wall disposed for selectively closing said lateral outlet of said unventilated upper chamber inside said container.

7. The composter according to claim 6, wherein said closure wall for closing off said lateral outlet is a plate-shaped slide disposed in said upper chamber and provided with a handgrip.

8. The composter according to claim 6, wherein said closure wall for closing off said lateral outlet of said upper chamber is a pivotable flap.

9. The composter according to claim 8, wherein said pivotable flap is biased into a closed position thereof.

10. The composter according to claim 8, wherein said pivotable flap is lockable in a closed position thereof.

11. The composter according to claim 1, which comprises a box-shaped insert disposed beneath said filling opening and forming said unventilated upper chamber together with said lateral outlet inside said container.

12. The composter according to claim 11, which comprises a plate-shaped slide disposed in said box-shaped insert, said slide (59) having a handgrip and being disposed to close said lateral outlet.

13. The composter according to claim 11, which comprises a pivotable flap disposed to close the said lateral outlet of said box-shaped insert.

14. The composter according to claim 13, wherein said pivotable flap is biased into a closed position thereof.

15. The composter according to claim 13, wherein said pivotable flap is lockable in a closed position thereof.

16. The composter according to claim 1, which comprises a trough disposed beneath said filling opening, said trough being pivotally mounted for pivoting about a horizontal pivot axis and forming said unventilated upper chamber together with said lateral outlet inside said container.

17. The composter according to claim 16, wherein said trough includes a movable flap disposed to close off said later outlet.

18. The composter according to claim 17, wherein said movable flap is biased into a closed position thereof.

19. The composter according to claim 1, wherein said lower plate is rigidly connected to a pivot, said pivot is rotatably mounted in said container and includes a pivot portion projecting out of said container and having said handle of said movement mechanism rigidly connected thereto.

20. The composter according to claim 19, wherein said handle of said movement mechanism is a one-armed lever.

21. The composter according to claim 19, wherein said handle of said movement mechanism is a crank.

22. The composter according to claim 19, which further comprises a locking device fitted on an outside of said container and disposed to be brought into engagement with said handle of said movement mechanism when said lower plate is disposed in the horizontal position.

23. The composter according to claim 1, wherein said lower plate has air passage openings formed therein.

24. The composter according to claim 1, wherein said lower plate is a grating.

25. The composter according to claim 1, wherein said container has a container wall disposed in a region of said ventilated vertical shaft and being formed with adjustable air passage openings.

26. The composter according to claim 25, which comprises at least one slide disposed for regulating a cross section of said air passage openings formed in said container wall.

27. The composter according to claim 25, wherein air passage openings are circular air passage openings and said container wall is provided with rotatable butterfly ventilators which, upon being rotated, control a cross section of said circular air passage openings formed in said container wall.

* * * * *